US011593639B1

(12) United States Patent
Garg et al.

(10) Patent No.: US 11,593,639 B1
(45) Date of Patent: Feb. 28, 2023

(54) SCORING EVENTS USING NOISE-CONTRASTIVE ESTIMATION FOR ANOMALY DETECTION

(71) Applicant: Amazon Technologies, Inc., Seattle, WA (US)

(72) Inventors: Pranav Garg, Jersey City, NJ (US); Baris Coskun, Glen Rock, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 782 days.

(21) Appl. No.: 16/559,393

(22) Filed: Sep. 3, 2019

(51) Int. Cl.
 *G06N 3/00* (2006.01)
 *G06N 3/08* (2023.01)
 *G06N 3/04* (2023.01)
 *G06F 21/31* (2013.01)
 *G06K 9/62* (2022.01)
 *G06F 17/16* (2006.01)

(52) U.S. Cl.
 CPC ............ *G06N 3/08* (2013.01); *G06F 21/316* (2013.01); *G06K 9/6259* (2013.01); *G06N 3/0472* (2013.01); *G06F 17/16* (2013.01)

(58) Field of Classification Search
 CPC ...... G06N 3/08; G06N 3/0472; G06F 21/316; G06F 17/16; G06K 9/6259
 See application file for complete search history.

(56) References Cited

U.S. PATENT DOCUMENTS

| 11,374,952 | B1* | 6/2022 | Coskun | G06N 3/08 |
| 2017/0302516 | A1* | 10/2017 | Tang | H04L 41/145 |
| 2018/0302423 | A1* | 10/2018 | Muddu | G06F 3/04842 |
| 2019/0188212 | A1* | 6/2019 | Miller | G06N 7/005 |
| 2020/0242399 | A1* | 7/2020 | Katoh | G06K 9/6256 |
| 2020/0285997 | A1* | 9/2020 | Bhattacharyya | G06N 7/00 |

OTHER PUBLICATIONS

Charu C. Aggarwal. Outlier Analysis. Springer, 2013. (Abstract Only).

(Continued)

*Primary Examiner* — Khai M Nguyen
(74) *Attorney, Agent, or Firm* — Patterson + Sheridan, LLP

(57) ABSTRACT

Techniques for monitoring a computing environment for anomalous activity are presented. An example method includes receiving a request to invoke an action within the computing environment. An anomaly score is generated for the received request by applying a probabilistic model to properties of the request. The anomaly score generally indicates a likelihood that the properties of the request correspond to historical activity within the computing environment for a user associated with the request. The probabilistic model generally comprises a model having been trained using historical activity within the computing environment for a plurality of users, the historical activity including information identifying an action performed in the computing environment and contextual information about a historical request. Based on the generated anomaly score, one or more actions are taken to process the request such that execution of requests having anomaly scores indicative of unexpected activity may be blocked pending confirmation.

19 Claims, 11 Drawing Sheets

(56) References Cited

OTHER PUBLICATIONS

Kiuyao Song, Mingxi Wu, Christopher M. Jermaine, and Sanjay Ranka. Conditional anomaly detection. IEEE Trans. Knowl. Data Eng., 19(5):631-645, 2007. (Abstract Only).

Tomas Mikolov, Kai Chen, Greg Corrado, and Jeffrey Dean. Efficient estimation of word representations in vector space. CoRR, abs/1301.3781, 2013, 12 pages.

Ting Chen, Lu An Tang, Yizhou Sun, Zhengzhang Chen, and Kai Zhang. Entity embedding-based anomaly detection for heterogeneous categorical events. In Proceedings of the Twenty-Fifth International Joint Conference on Artificial Intelligence, IJCAI 2016, New York, Ny, USA, Jul. 9-15, 2016, pp. 1396-1403, 2016.

Chong Zhou and Randy C Paffenroth. Anomaly detection with robust deep autoencoders. In Proceedings of the 23rd ACM SIGKDD International Conference on Knowledge Discovery and Data Mining, pp. 665-674. ACM, 2017.

Michael Gutmann and Aapo Hyvarinen. Noisecontrastive estimation: A new estimation principle for unnormalized statistical models. In Proceedings of the Thirteenth International Conference on Artificial Intelligence and Statistics, AISTATS 2010, Chia Laguna Resort, Sardinia, Italy, May 13-15, 2010, pp. 297-304, 2010.

* cited by examiner

| USER ACTIVITY HISTORY | | | | |
|---|---|---|---|---|
| ACCOUNT ID | USER NAME | TIMESTAMP | IP ADDRESS | REQUEST |
| b6f0df04 | jsmith | 05/21/2019 10:29:31 | 99.86.80.101 | createInstance_USWest |
| b6f0df04 | jsmith | 05/21/2019 10:29:55 | 99.86.80.101 | createInstance_USWest |
| b6f0df04 | jsmith | 05/21/2019 10:30:22 | 99.86.80.101 | createInstance_USWest |
| b6f0df04 | jsmith | 05/21/2019 10:30:59 | 99.86.80.101 | createInstance_USWest |
| b6f0df04 | jsmith | 05/21/2019 18:29:02 | 99.86.80.101 | terminateInstance_USWest |
| b6f0df04 | jsmith | 05/21/2019 18:29:45 | 99.86.80.101 | terminateInstance_USWest |
| b6f0df04 | jsmith | 05/21/2019 18:30:14 | 99.86.80.101 | terminateInstance_USWest |
| b6f0df04 | jsmith | 05/21/2019 18:31:01 | 99.86.80.101 | terminateInstance_USWest |
| b6f0df04 | jsmith | 05/22/2019 10:28:58 | 99.86.80.101 | createInstance_USWest |
| b6f0df04 | jsmith | 05/22/2019 10:29:29 | 99.86.80.101 | createInstance_USWest |
| b6f0df04 | jsmith | 05/22/2019 10:30:42 | 99.86.80.101 | createInstance_USWest |
| b6f0df04 | jsmith | 05/22/2019 10:31:21 | 99.86.80.101 | createInstance_USWest |
| b6f0df04 | jsmith | 05/22/2019 18:29:58 | 99.86.80.101 | terminateInstance_USWest |
| b6f0df04 | jsmith | 05/22/2019 18:30:32 | 99.86.80.101 | terminateInstance_USWest |
| b6f0df04 | jsmith | 05/22/2019 18:31:12 | 99.86.80.101 | terminateInstance_USWest |
| b6f0df04 | jsmith | 05/22/2019 18:31:49 | 99.86.80.101 | terminateInstance_USWest |
| b6f0df04 | jsmith | 05/23/2019 10:29:11 | 99.86.80.101 | createInstance_USWest |
| b6f0df04 | jsmith | 05/23/2019 10:29:43 | 99.86.80.101 | createInstance_USWest |
| b6f0df04 | jsmith | 05/23/2019 10:30:11 | 99.86.80.101 | createInstance_USWest |
| b6f0df04 | jsmith | 05/23/2019 10:30:38 | 99.86.80.101 | createInstance_USWest |
| b6f0df04 | jsmith | 05/23/2019 18:29:11 | 99.86.80.101 | terminateInstance_USWest |
| b6f0df04 | jsmith | 05/23/2019 18:29:46 | 99.86.80.101 | terminateInstance_USWest |
| b6f0df04 | jsmith | 05/23/2019 18:30:16 | 99.86.80.101 | terminateInstance_USWest |
| b6f0df04 | jsmith | 05/23/2019 18:30:41 | 99.86.80.101 | terminateInstance_USWest |

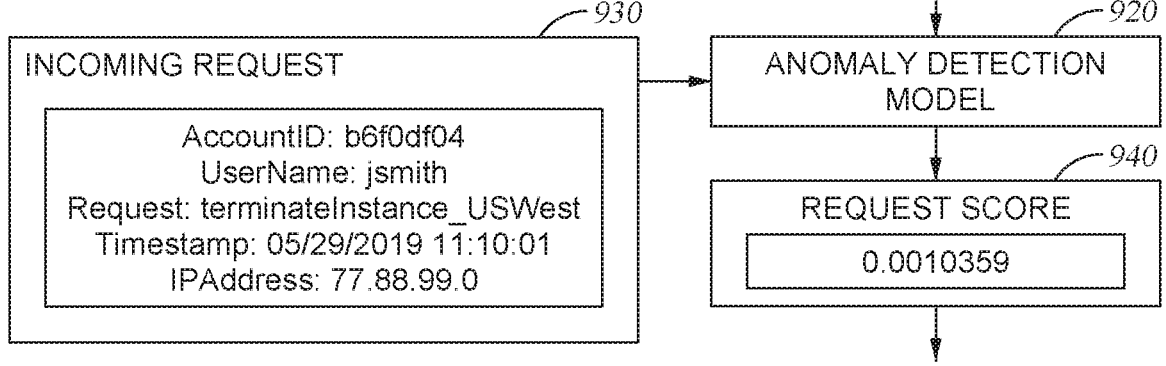

INCOMING REQUEST

AccountID: b6f0df04
UserName: jsmith
Request: terminateInstance_USWest
Timestamp: 05/29/2019 11:10:01
IPAddress: 77.88.99.0

ANOMALY DETECTION MODEL

REQUEST SCORE
0.0010359

OUTPUT SCORE TO REQUEST PROCESSOR TO ALLOW OR BLOCK REQUEST

SCORING EVENTS USING NOISE-CONTRASTIVE ESTIMATION FOR ANOMALY DETECTION

BACKGROUND

The present invention relates to detecting anomalous events in a distributed computing system, and more specifically, to using scoring models trained on user activity within the distributed computing system to identify potentially anomalous events and take action to respond to such potentially anomalous events.

BRIEF DESCRIPTION OF DRAWINGS

FIG. 9 illustrates an example training data set used to train a scoring model and an application of the scoring model to determine whether a request is a probable anomalous request, according to one embodiment.

DETAILED DESCRIPTION

Figure 1:
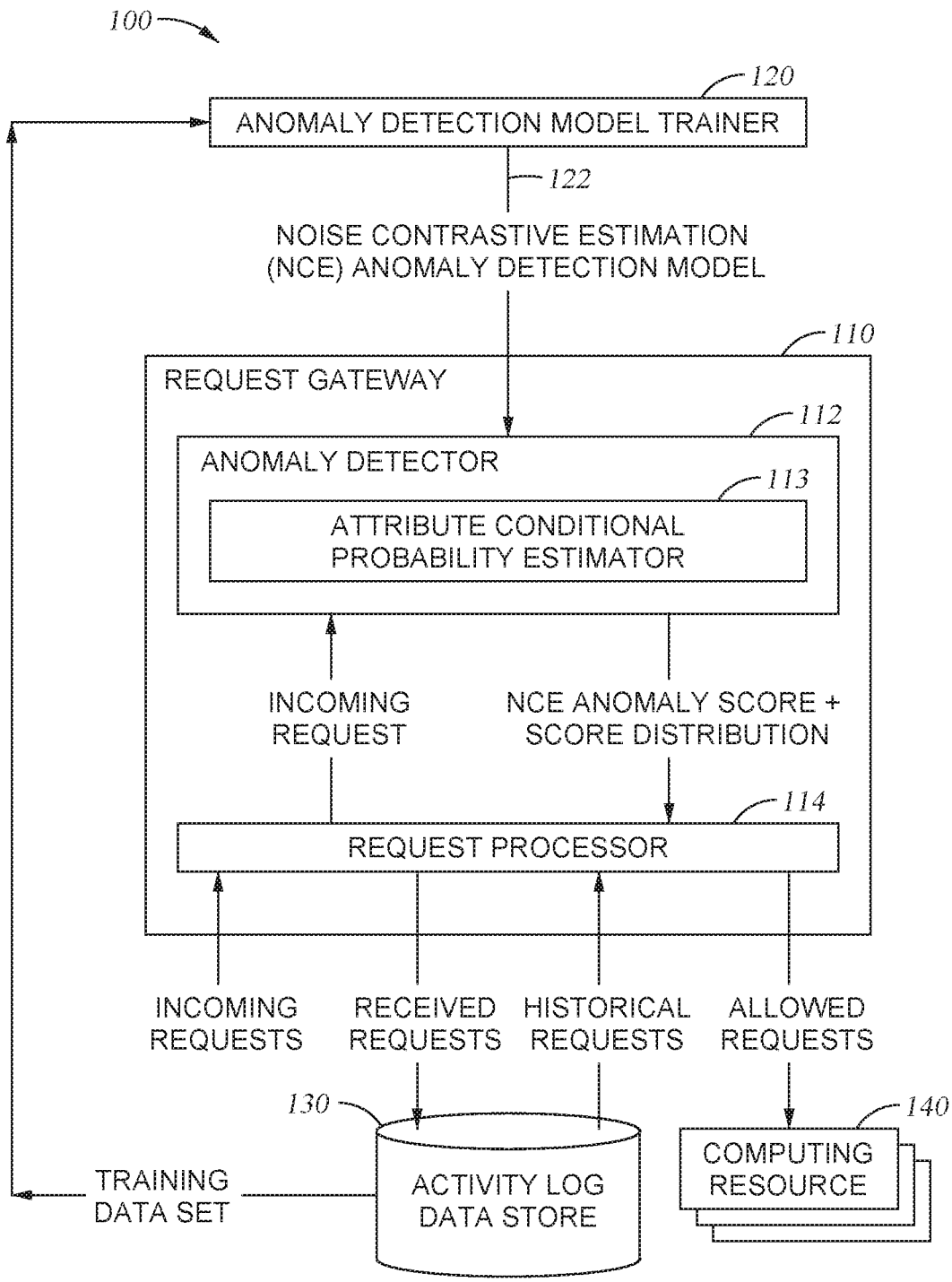
FIG. 1 illustrates an example distributed computing environment in which scoring models are used to determine whether incoming requests to perform actions within the distributed computing environment are potentially anomalous actions, according to one embodiment.

Embodiments described herein describe techniques for using trained scoring models to recognize potentially anomalous activity within a distributed computing system based on historical user activity within the distributed computing system. Generally, users of a computing system may perform actions within the computing system according to a pattern of activity. For example, users may request the creation and termination of cloud computing instances according to a roughly defined schedule, such as the beginning and end of a work day. In another example, users may log into and out of a distributed computing system at particular times of the day and from particular locations. Because users of a computing system may perform various actions according to a regular pattern of activity, it may be assumed that future activity that looks similar to historical activity (e.g., requests to perform a particular action at consistent or near-consistent times and from the same or similar locations) is likely regular, expected activity for the user. Conversely, it may be further assumed that future activity that does not conform to the regular pattern of activity for a particular user constitutes potentially anomalous activity, and thus, may be subject to further examination prior to allowing or disallowing that activity from proceeding.

Because user activity data may include a large number of records and each record may include a highly dimensional attributes (e.g., a number of request attributes and a number of contextual attributes) describing each record, comparisons between information in a user activity data set and information about a received request to determine whether a received request is potentially anomalous activity may be impractical. Further, various aspects of user activity may complicate determinations of whether requests in a computing system are anomalous or non-anomalous. For example, while some events may be anomalous with respect to a global data set of requests generated by a plurality of users, that fact alone may not necessarily indicate that such events are actually anomalous for the user associated with these events. In another example, numerous users may perform activity consistent with a particular pattern (e.g., performing actions to create cloud computing instances at the beginning of a work day and corresponding actions to pause or terminate the cloud computing instances at the end of the work day); however, this pattern of activity may be anomalous for a user that does not operate on the same schedule.

To determine whether requests to perform actions within a distributed computing environment are anomalous for a particular user, embodiments presented herein use scoring models that use noise contrastive estimation techniques to generate anomaly scores for a request to perform an operation in a computing environment as a combination of conditional probabilities estimated for each attribute of the request. Based on the generated anomaly score for a request, a determination of whether a request is anomalous or non-anomalous may be performed given the context of the incoming request (e.g., the user making the request, the location from which the request was generated, the time at which the request was generated, the requested actions, etc.). A system can allow or disallow performance of the requested action based on the generated anomaly score. For example, incoming requests that result in the generation of anomaly scores indicating a high likelihood that a request corresponds to previous non-anomalous activity may be assumed to be legitimate requests and may be executed within the distributed computing system, while incoming requests that result in the generation of low probability scores may be deemed to be potentially anomalous requests. A system can disregard requests having low probability scores or request further information from a user to determine whether an event having a low probability score should be executed or blocked. Anomaly scores may further be generated for previously executed requests in the computing environment to identify, for example, fraudulent activity within the computing system (e.g., fraudulent generation of cloud computing instances, payment fraud, etc.), attacks against the computing environment, and other anomalous activity within the computing environment.

FIG. 1 illustrates an example computing environment 100 in which a scoring model is trained using historical activity data and deployed to a request gateway to determine whether requests to perform an action within the computing environment 100 are potentially anomalous events. As illustrated, computing environment 100 includes a request gateway 110, an anomaly detection model trainer 120, an activity log data store 130, and one or more computing resources 140.

Request gateway 110 generally serves as a publicly-facing system through which users request the performance of various actions within the computing environment 100 (e.g., through the execution of one or more functions on computing resources 140). Generally, request gateway 110 receives requests from users of computing environment 100 or from a historical data log of activity within computing environment 100, calculates an anomaly score for each request, and uses the calculated anomaly score to determine whether an request is potentially anomalous and take action to handle the request based on the determination of whether a request is potentially anomalous. As illustrated, request gateway 110 includes an anomaly detector 112 and a request processor 114.

Anomaly detector 112 generally is configured to calculate an anomaly score for each incoming request using an anomaly detection model 122 trained by anomaly detection model trainer 120 using user activity data from activity log data store 130, as discussed in further detail below. The anomaly score calculated for each incoming request may, in some embodiments, be a conditional probability calculated using noise contrastive estimation techniques.

As illustrated. anomaly detector 112 includes an attribute conditional probability estimator 113. Attribute conditional probability estimator 113 may implement an anomaly detection model 122 (trained by the anomaly detection model trainer 120) using noise contrastive estimation techniques and a neural network, as discussed in further detail herein, to calculate anomaly scores as a combination of estimated conditional probabilities for each attribute in a request. As discussed in further detail herein, the calculation of anomaly scores as combinations of estimated conditional probabilities for each attribute in a request may approximate an estimated joint probability distribution over the attributes in a request and may allow for the calculation of anomaly scores over a subset of relevant attributes in a request.

To calculate an anomaly score for an incoming request, anomaly detector 112 may receive information about a request from a request processor 114 or from historical requests stored in activity log data store 130. Each request may be defined as a set of event attributes and a set of contextual attributes. The set of event attributes may include, for example, information about the requested action and parameters for the requested action. For example, the event attributes for a request to instantiate a cloud computing instance on computing resources 140 may include, for example, an indication of the function invoked to create a cloud computing instance and information about the instance to be created, such as operating system, software to be deployed on the cloud computing instance, templates defining the operational characteristics of the cloud computing instance, the physical location at which the cloud computing instance is to be instantiated, and the like. The contextual attributes may include, for example, information about the request itself, such as information identifying the user that generated the request, an account associated with the user, timestamp data, location data (e.g., an internet protocol (IP) address associated with the device that transmitted the incoming request to request gateway 110, geolocation data included in a request or derived from an IP address, etc.). Information identifying the contextual attributes to use in determining whether an event is anomalous or non-anomalous may be defined by a user according to contextual information found to have been relevant to determining whether evets correspond to anomalous or non-anomalous activity.

Using the event attributes and contextual attributes, request anomaly detector 112 may input the information about the incoming request into a scoring model trained by anomaly detection model trainer 120 to generate a score indicating a probability that the incoming request is consistent with historical requests generated for the user identified in the incoming request. The score may represent a probability that an incoming request is consistent with the historical user activity within the computing environment 100, where low probability scores are indicative of events that are not consistent with historical user activity and high probability scores are indicative of events that are consistent with historical user activity. Generally, by analyzing the contextual attributes of an incoming request in conjunction with the event attributes describing the requested actions, request anomaly detector 112 may detect potentially anomalous activity relative to the user identified in the incoming request. As discussed above, because some activity may not be anomalous with respect to a global population, but may be anomalous with respect to a particular user, embodiments presented herein may detect anomalies that may not be detected if analyzed against a global data set.

To calculate an anomaly score for an incoming request and determine whether an incoming request is potentially anomalous, a conditional probability distribution P(a|c) for an event with event attributes $a=(a_1, a_2, \ldots, a_n)$ and contextual attributes $c=(c_1, c_2, \ldots, c_m)$ may be factorized using the chain rule according to the equation:

$$P(a \mid c) = P(a_{1 \ldots n} \mid c_{1 \ldots m}) = \prod_{i=1}^{n} P(a_i \mid a_{i+1 \ldots n}, c_{1 \ldots m}).$$

Each of the conditional probability distributions $P(a_1 | a_{i+1 \ldots n}, c_{1 \ldots m})$ may be distributions over a single event attribute, $a_i$, such that individual conditional probability distributions are learned for all attributes jointly and simultaneously. When each of the individual conditional probabilities are learned, the product of each of the conditional probabilities estimates P(a c).

Generally, the anomaly detection model generated by anomaly detection model trainer 120 maps each input event attribute into a low-dimensional continuous representation that allows the model to learn relationships between discrete event attributes that may be implicit in the data. In some embodiments, two different embeddings may be learned for each event attribute. A first embedding may be used while estimating the conditional probability distribution of the attribute, and a second embedding may be used when the attribute appears as a contextual attribute while estimating the conditional probability distribution of a different attribute. Conditional probability distribution functions may be learned over the embedded representations using various techniques, such as noise contrastive estimation.

In some embodiments, to estimate $P(a_1|a_{i+1\ldots n}, c_{1\ldots m})$, for each positive sample event, a number of negative samples may be generated based on a unigram distribution over a set of event attributes. Embedding functions $g^{\mathcal{A}_j}$, $j \in \mathcal{A}_{i+1\ldots n}$ and $g^{C_k}$, $j \in C_{1\ldots m}$ may be used to embed the respective attributes to create the context for an attribute $\mathcal{A}_i$. A combined context $v_i$ may be represented as a weighted combination of the embedding representations of the context attributes according to the equation:

$$v_i = \sum_{j=i+1}^{n} w_{ij} \cdot g^{\mathcal{A}_j}(a_j) + \sum_{k=1}^{m} w'_{ik} \cdot g^{C_k}(c_k).$$

The log probability $\log p_\theta^i(a_i|a_{i+1\ldots n}, c_{1\ldots m}) = v_i \odot h^{\mathcal{A}_i}(a_i)$ may be modeled as a dot product between the context $v_i$ and the embedding representation of an attribute $a_i$. Generally, the parameters $\theta$ may include each of the embedding functions g and h shared across the noise contrastive estimation models that individually estimate conditional probability densities for each event attribute and weights for each i. In some embodiments, the architecture that models conditional probability density functions for each attribute $a_i$ may be based on a vector log-bilinear model that uses noise contrastive estimation to learn word embeddings, combined in a manner that allows for the estimation of conditional probability distribution functions over arbitrary events having multiple attributes.

In some embodiments, a posterior probability for individual noise contrastive estimation discriminators may be represented by the equation:

$$P_i(D = 1 | a_{1\ldots n}, c_{1\ldots m}, \theta) = \frac{p_\theta^i(a_i | a_{i+1\ldots n}, c_{1\ldots m})}{p_\theta^i(a_i | a_{i+1\ldots n}, c_{1\ldots m}) + K \cdot q_i(a_i)}$$

The parameters $\theta$ may be learned by maximizing the posterior log-likelihood for each discriminator in a joint manner:

$$\theta^* = \max_\theta J(\theta), \text{ where } J(\theta) = \sum_{i=1}^{n} J_i(\theta), J_i(\theta) =$$

$$\sum_{e \in D} \left( \log P_i(D = 1 | a_{1\ldots n}, c_{1\ldots m}, \theta) + \sum_{e' \sim q_i} \log P_i(D = 0 | a_{1\ldots n}, c_{1\ldots m}, \theta) \right)$$

A normalization constant for the probability distribution functions may be learned as part of the network. When optimal parameters $\theta^*$ are obtained, an anomaly score for an event e=(a, c) may be represented by the equation $$anomalyScore(e) = -\log P(a | C) = -\sum_i \log p_\theta^i.$$

Request anomaly detector 112 returns the calculated anomaly score to request processor 114, which uses the calculated anomaly score to determine whether to process the request based on whether the request constitutes anomalous activity with respect to the user identified in the request.

Request processor 114 generally receives incoming requests from client devices that instruct computing environment 100 to perform one or more actions with respect to computing resources 140. As discussed, request processor 114 may provide information about the incoming request (e.g., event attributes defining the properties of the requested event and contextual attributes defining information about the user that generated the request) to request anomaly detector 112 to obtain an anomaly score. When request processor 114 receives the anomaly score from request anomaly detector 112, request processor 114 can examine the anomaly score against one or more threshold scores to determine whether the incoming request represents a potentially anomalous request for the user. The threshold score may be defined globally (e.g., for all users of computing environment 100), on a per-user basis, or on a per-user-group basis. Generally, the threshold score may define a minimum score for an event to be considered a non-anomalous event.

If request processor 114 determines, based on a comparison of the threshold score and the received anomaly score for an incoming request, that the incoming request is a non-anomalous request, request processor 114 can execute the action(s) identified in the incoming request against the computing resources 140 specified in the incoming request. For example, the actions may include authenticating a user, instantiating or terminating cloud computing instances, instantiating or deallocating dynamic storage systems for the user, changing routing information for the user, changing a geographic location at which cloud computing instances are instantiated, and other operations that may be performed to configure and operate cloud computing instances in a dynamically scalable computing environment.

If, however, request processor 114 determines that the incoming request is a potentially anomalous request based on a comparison of the threshold score and the received anomaly score for the incoming request, request processor 114 can take one or more actions to verify that the request is a legitimate request or determine that the request is, in fact, an anomalous request that should not be executed. In some embodiments, request processor 114 can use information about the user identified in the incoming request to obtain contact information for the user and push, to the user, a request to verify that the incoming request was generated by the user. For example, user information included in the incoming request (e.g., user account information, such as a user name, an account identifier, etc.) may be used to find user contact information, such as a mobile phone number or e-mail address, in a user database. A notification (e.g., in the form of a short message service (SMS) or multimedia message service (MMS) message, an e-mail, a voice call, a push notification through an application installed on a user's computing device, etc.) may be generated to request that a user confirm that the incoming request is legitimate activity. If the user confirms that the incoming request is legitimate activity, request processor 114 can execute the action(s) identified in the incoming request against the computing resources 140 specified in the incoming request or otherwise unblock execution of the action(s) identified in the incoming request. Otherwise, if the user indicates that the incoming request corresponds to illegitimate activity or does not respond to the request, request processor 114 can drop the incoming request such that no action is performed against computing resources 140 in response to receipt of the incoming request.

Generally, request processor 114 may write information about the incoming requests received at request processor 114 to activity log data store 130 for use in re-training the anomaly detection model used by request anomaly detector 112 to determine whether incoming requests are potentially anomalous for a given user. In some embodiments, request processor 114 may write information about non-anomalous events to activity log data store 130 such that information about anomalous events may not be used to train the anomaly detection model. In some embodiments, user feedback about potentially anomalous events may be used to augment the historical user activity data stored in activity log data store 130 to improve the accuracy at which an anomaly detection model executed by request anomaly detector 112 determines whether incoming requests correspond to anomalous or non-anomalous activity. For example, if a user indicates that an incoming request flagged as potentially anomalous is, in fact, non-anomalous, information about the incoming request may be tagged with an indication that the incoming request corresponds to legitimate activity for the user. When the anomaly detection model is re-trained (which may occur on-demand or periodically), the anomaly detection model may take into account activity marked as legitimate to generate one or more rules for identifying similar activity as non-anomalous activity in the future.

Generally, some amount of anomalous events may be expected to occur for each user of computing resources 140 in computing environment 100 during typical operations within the computing environment 100. However, a spike or other abnormality in the number of anomalous events detected for a given user within a given time period may be indicative of illegitimate activity being generated by a user of computing environment 100 (e.g., due to compromised credentials allowing other persons to impersonate a user, malware programmed to hijack a user's cloud computing instances, etc.). To determine whether the rate at which anomalous activity is generated for a user is within an expected amount for a given window of time, request processor 114 may maintain a counter that tracks a number of potentially anomalous events generated by each user of the computing environment 100 over the window of time. If the counter tracking events flagged as potentially anomalous by request anomaly detector 112 exceeds a threshold number of events over a time window, request processor 114 may take one or more actions to verify that the user has not been compromised and, if so, take one or more actions to rectify any compromise of user credentials or otherwise attempt to reduce the occurrence of potentially anomalous activity generated by the user.

Anomaly detection model trainer 120 generally is configured to use a training data set of event information to train an anomaly detection model and deploy the trained anomaly detection model to request anomaly detector 112 for use in identifying whether incoming requests correspond to non-anomalous or potentially anomalous activity. In some embodiments, anomaly detection model trainer may be configured to train the anomaly detection model using unsupervised learning techniques. Using unsupervised learning techniques, such as noise contrastive estimation, a training data set may be processed to generate a representation of the training data set that recognizes data that is closer to a cluster of non-anomalous events as likely to also correspond to non-anomalous events and data that is further away from clusters of non-anomalous events to correspond to potentially anomalous events.

In some embodiments, anomaly detection model trainer 120 may be configured to generate training data from historical request data stored in activity log data store 130 to account for expected future activity for a user that may be initially flagged as potentially anomalous activity. For example, suppose that a user is located in California and typically generates activity to create and terminate cloud computing instances on computing resources 140 according to a consistent schedule (e.g., creates cloud computing instances every weekday at the beginning of the work day and terminates the cloud computing instances at the end of the work day). In such an example, activity originating from an IP address in California around the specified times may be considered non-anomalous. Now suppose that the user relocates to London and expects to create and terminate cloud computing instances on computing resources according to the same schedule locally. Because the activity from London may be performed at a different time (e.g., eight hours earlier than would be expected for requests received from California), the anomaly detection model may initially flag the activity originating from London as potentially anomalous because of the change in location and timing of the activity. To reduce the likelihood that expected legitimate activity will be flagged as potentially anomalous, anomaly detection model trainer 120 can use information provided by a user about the properties of expected future legitimate activity (e.g., requests to perform actions within computing environment 100) to generate additional training data that substantially corresponds to the expected activity. Turning back to the example of a user relocating from California to London, a set of historical request data stored in activity log data store may be modified to reflect the earlier times at which activity may be generated and to reflect an IP address located in or near London. The data stored in activity log data store, along with the generated data, may be amalgamated into a training data set and used by anomaly detection model trainer 120 to update an anomaly detection model and deploy the updated anomaly detection model to request anomaly detector 112.

Activity log data store 130 generally provides a data repository in which historical information about user activity within computing environment may be stored for use in training an anomaly detection model. Activity log data store 130 may be structured, for example, as a relational database, a non-relational database, a flat file store including one or more files in which user activity information is stored, and the like. Generally, data stored in activity log data store 130 may include information about each request processed in the computing environment 100. This information may include event information identifying the activity requested by a user and contextual information providing information about the request. This contextual information may include, for example, information about a location from which the request was generated and time at which the request was generated, username and account information, and other information that may be used in conjunction with the event information to train an anomaly detection model to generate conditional probabilities representing a likelihood that a particular user generated a request to perform a particular action at a given time and from a given location. Generally, activity log data store 130 may be periodically augmented to include information about activity generated by new users and additional activity generated by existing users so that the anomaly detection model may be retrained.

Computing resources 140 generally represent various cloud computing resources that users can execute requests against to obtain or release computing resources for use in performing a given task. These computing resources may include, for example, dynamically allocable virtual machines or other cloud computing instances, cold storage instances for storing data in a persistent manner, database services used by other cloud computing instances in computing environment 100, machine learning system instances, request routers, load balancers, and other computing resources that may be dynamically assigned to serve various users within the cloud computing environment. Generally, request processor 114 may execute requests against the computing resources 140 if, as discussed above, the requests are determined to correspond to non-anomalous activity or if a user indicates that potentially anomalous activity corresponds to legitimate, non-anomalous activity.

In some embodiments, the techniques described above may be used to monitor for potentially fraudulent activity by users of computing environment 100. To determine whether a user is engaged in potentially fraudulent activity within computing environment 100, request anomaly detector 112 may receive a data set of historical requests generated by the user over a period of time. The data set may include a plurality of requests to perform actions within computing environment 100, and information about each request may specify the requested action, parameters of the requested action, and contextual information about each request (e.g., a time at which the request was generated, a location from which the requested action was generated, and the like).

Request anomaly detector 112 may generate anomaly scores for each request in the plurality of requests and, in some embodiments, may calculate a distribution of the generated anomaly scores to determine whether the user is potentially engaged in fraudulent activity within computing environment 100. For example, in calculating a distribution of the generated anomaly scores, request anomaly detector 112 can generate a histogram showing the frequency at which ranges of anomaly scores are calculated for requests in the data set. In some embodiments, it may be assumed that a user that is not potentially engaged in fraudulent activity may be associated predominantly with requests having high probability scores (e.g., requests that are likely to represent expected action for the user within the computing environment 100), while a user that is potentially engaged in fraudulent activity may have a bimodal distribution of probability scores (e.g., a large number of requests having low probability scores and a large number of requests having high probability scores), or a distribution skewed towards requests having low probability scores. In another example, request anomaly detector can identify the number of requests in the data set having anomaly scores less than a threshold score defined for potentially anomalous events. If the number of potentially anomalous events exceeds a threshold value (e.g., an absolute number of potentially anomalous events or a percentage of the requests associated with the user for a given time period), request anomaly detector can determine that the user is potentially engaged in fraudulent activity.

For example, generating anomaly scores for each request in a plurality of requests associated with a user of computing environment 100 may be used to identify a variety of fraudulent activities within computing environment 100. High rates of anomalous requests may indicate, for example, that an account has been compromised (e.g., in a scenario in which existing cloud computing instances associated with a user are replaced with cloud computing instances with different software configurations and located in a different geographic region). In another example, high rates of anomalous requests associated with a user may indicate unauthorized creation of cloud computing instances or unauthorized instantiation of on-demand computing resources.

When request anomaly detector 112 determines that a user is potentially engaged in fraudulent activity, request anomaly detector 112 can take various actions to prevent the user from generating additional activity within computing environment 100. For example, login credentials for the user may be changed to prevent the user from logging into computing environment 100 using previously valid login credentials or authenticating requests to perform actions in computing environment 100 at request gateway 110. In another example, request gateway 110 may be configured to drop received requests associated with the user or queue such requests for execution after user confirmation that the requests are legitimate requests to perform actions within computing environment 100 (e.g., were not generated by someone pretending to be the user).

Figure 2A:
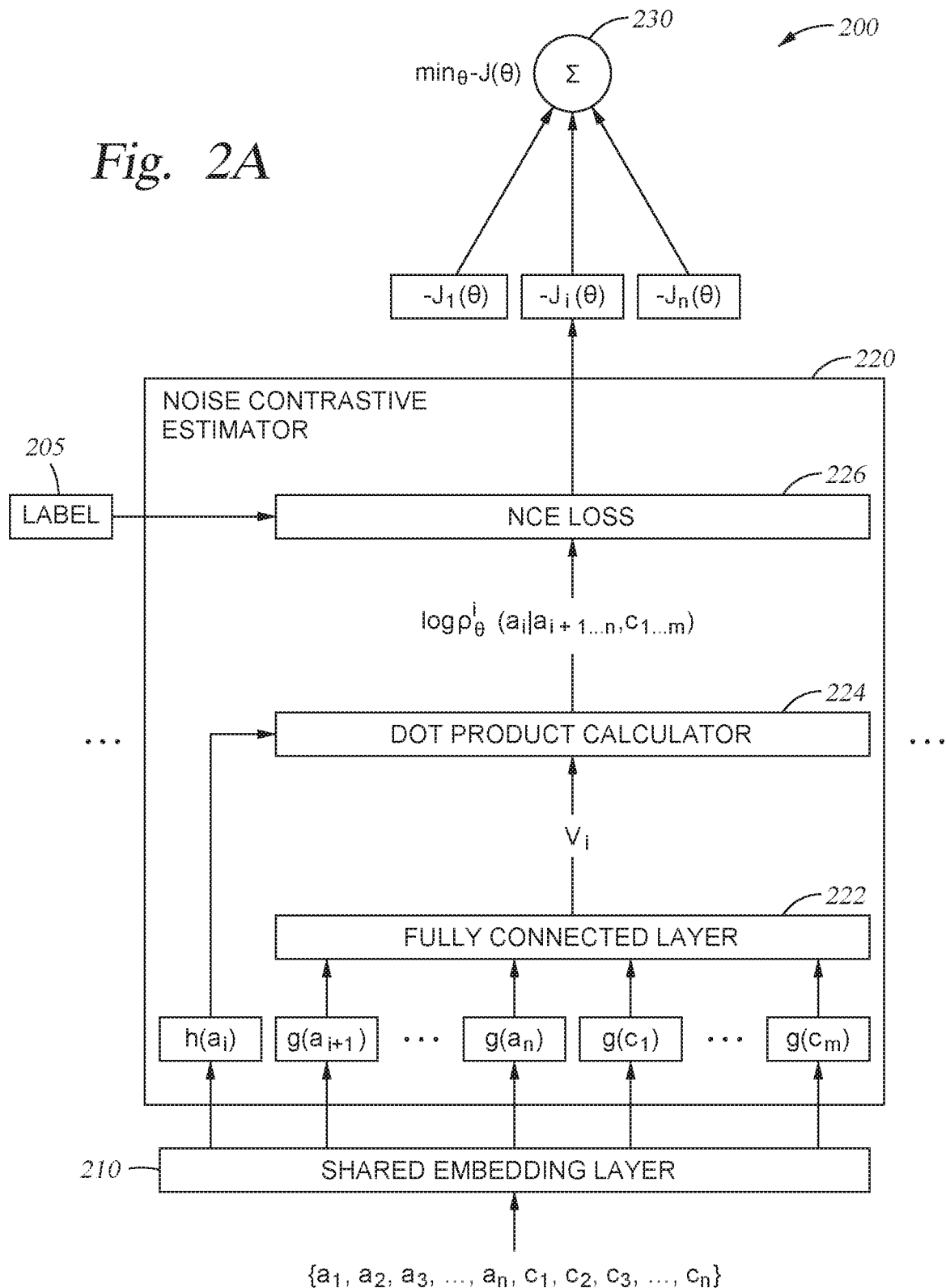
FIG. 2A illustrates an example neural architecture of a model used to calculate anomaly scores for requests in a distributed computing environment based on estimated conditional probabilities for each attribute in a request, according to one embodiment.

FIG. 2A illustrates an example neural architecture 200 of a model used to calculate anomaly scores for requests in a distributed computing environment (e.g., distributed computing environment 100 illustrated in FIG. 1), according to an embodiment. For example, the neural architecture 200 may represent one embodiment of a model 122 trained by the anomaly detection model trainer 120 and executed within attribute conditional probability estimator 113 illustrated in FIG. 1. As illustrated, neural architecture 200 includes a shared embedding layer 210, a noise contrastive estimator 220, and a summation function 230.

Shared embedding layer 210 generally is configured to learn two embeddings for each event attribute a in a request. A first embedding h, may be used while estimating a conditional probability distribution of the attribute a, and a second embedding g may be used when the attribute a appears as context while estimating a conditional probability distribution of a different attribute. Conditional probability distribution functions may be learned over embeddings h and g using, for example, noise contrastive estimation, which generally reduces a density estimation problem to a binary classification task of distinguishing observed data points from random data points sampled from a known noise distribution. In using noise contrastive estimation to learn a probability distribution function, a number of random samples x' may be drawn from a noise distribution and use to train a binary classifier that discriminates between a sample x in a data set and the random samples x'. These conditional probability distribution functions may be conditioned on an a priori user-defined subset of request and conditional attributes that may be indicative of whether activity within a computing environment corresponds to anomalous or non-anomalous activity. The subset of attributes may comprise a subset of request and conditional attributes recorded in activity log data store 130, as not all of the information recorded about a request within the computing environment 100 may be probative or relevant to a determination of whether activity within a computing environment corresponds to anomalous or non-anomalous activity.

While noise contrastive estimation over a single entry, such as word probability, is feasible, computing distributions for each attribute in a multi-dimensional setting such as a distributed computing environment in which requests include various request attributes and various contextual attributes may be a computationally complex task. To reduce the complexity of the task, shared embedding layer 210 may be configured to embed entities into low-dimensional vector representations such that noise contrastive estimation can be used to learn probability densities over the low-dimensional vector representations. By embedding entities into low-dimensional vector representations through shared embedding layer 210, neural architecture 200 may learn relationships between different attributes in a request that are implicit in a request.

Each noise contrastive estimator 220 is generally configured to calculate conditional probabilities for an attribute of a request in view of contextual attributes of the request and output the calculated conditional probability for combination with conditional probabilities for other attributes of the request to generate an anomaly score for the request. As illustrated in FIG. 2A, an $i^{th}$ noise contrastive estimator 220 may generate a conditional probability for the $i^{th}$ attribute of a request.

As discussed, to above, to estimate a conditional probability for a request defined as a set of request attributes a and contextual attributes c, a number of negative samples may be generated from the set of request attributes a and contextual attributes c, and the outputs of embedding functions g may be combined in fully connected layer 222 to generate a combined context $v_i$ for a request to create the context for a set of request attributes.

The combined context $v_i$ may be combined with the embedding function h (e.g., the embedding representation of a given attribute $a_i$) at dot product calculator 224 to generate a log probability for the attribute $a_i$. The log probability for the attribute $a_i$ may thus be represented according to the equation $\log p_\theta^i(a_i|a_{i+1 \ldots n}, c_{1 \ldots m}) = v_i \odot h^{\mathcal{A}_i}(a_i)$, where the parameters $\theta$ include the embedding functions g and h that individually estimate conditional probability densities for each request attribute, along with weight values for each attribute. The log probability generated for a given attribute a by dot product calculator 224 may be modified at NCE loss function 226 using label data 205. Label data 205 may represent a correction or modification made to a calculated probability score based, for example, on feedback, information indicating if the record was generated synthetically by sampling an unknown distribution of event data, information indicating that a given input corresponds to anomalous or non-anomalous data, or the like. Label data 205 may be associated with each record $\{a_1, a_2, \ldots a_n|c_1, c_2, \ldots c_m\}$ that is input while training a model used to calculate anomaly scores for requests in a distributed computing environment.

Conditional probability estimation may be performed within neural architecture 200 for each request attribute in a request. Examples of request attributes include an API function invoked through the request, the user invoking the API function, an account associated with the user, and other information that may be relevant to determining whether a request corresponds to anomalous or non-anomalous activity. As illustrated, the output of neural architecture 200 may be a summation of the estimated conditional probability for each attribute in a request. Each of these conditional probabilities may use low-dimensional representations to model high-dimensional categorical data (e.g., request attributes) so that requests to perform an action within computing environment 100 may be considered in their own context and so that conditional probabilities may be estimated over a highly dimensional request space.

Figure 2B:
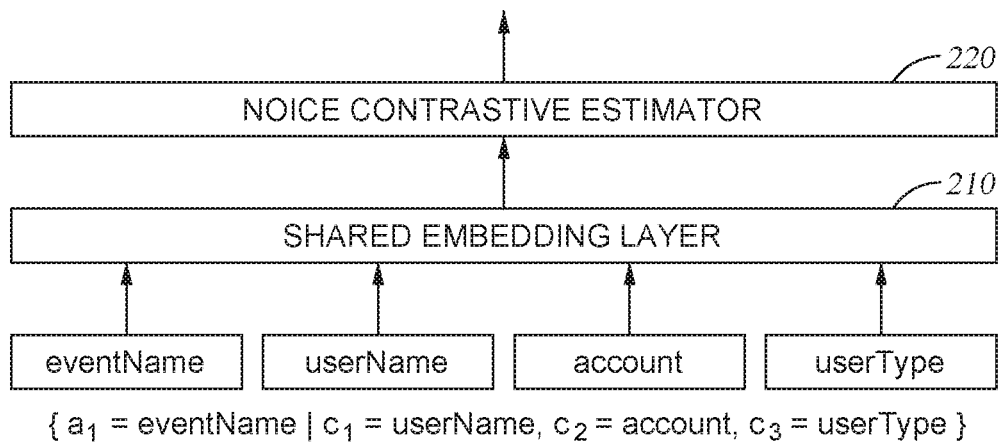
FIGS. 2B and 2C illustrate the generation of conditional probabilities for different attributes in a request using the example neural architecture illustrated in FIG. 2A, according to one embodiment.
Figure 2C:
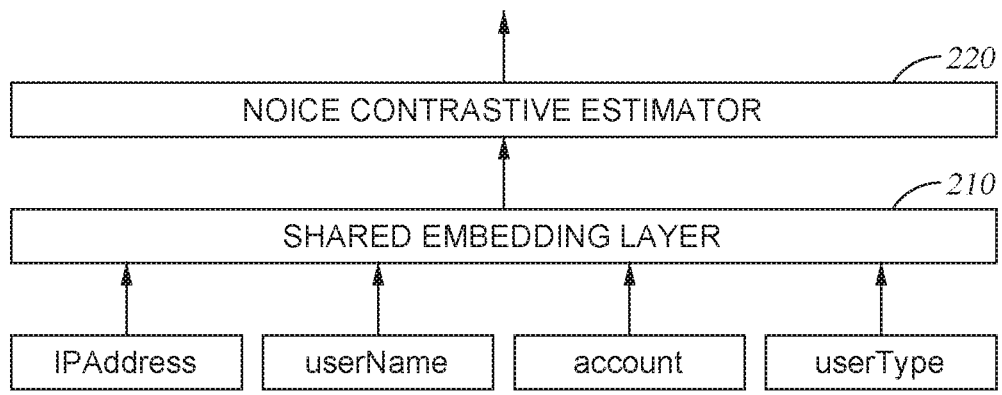

FIGS. 2B and 2C illustrate examples in which neural architecture 200 illustrated in FIG. 2A is used to generate conditional probabilities for different attributes in a request, according to an embodiment. As illustrated, a request may be represented by the data set $\{a_1=\text{eventName}, a_2=\text{IPAddress}|c_1=\text{userName}, c_2=\text{account}, c_3=\text{userType}\}$, where $a_1$ and $a_2$ correspond to different attributes in the request for which conditional probabilities are to be calculated and $c_1$, $c_2$, and $c_3$ correspond to different contextual attributes that are used in calculating conditional probabilities for attributes $a_1$ and $a_2$.

In FIG. 2B, a conditional probability for event attribute $a_1$ (e.g., the eventName attribute) may be generated by inputting the eventName, userName, account, and userType parameters into shared embedding layer 210, which may generate contextual embeddings for the userName, account, and userType contextual attributes and may generate an embedding representation of the eventName attribute. These embeddings may be processed through a fully connected layer 222 of noise contrastive estimator 220 (and any rectifier linear units, not illustrated, used to process the output of fully connected layer 222) and a loss function (e.g., NCE loss 226 of noise contrastive estimator 220), to generate a conditional probability for the eventName attribute, represented by the value $-J_1(\theta)$. The conditional probability generated for the eventName attribute may be combined with the conditional probability generated for the IPAddress attribute, represented by the value $-J_2(\theta)$, as illustrated in FIG. 2C, to generate the anomaly score for the request represented by the data set $\{a_1=\text{eventName}, a_2=\text{IPAddress}|c_1=\text{userName}, c_2=\text{account}, c_3=\text{userType}\}$.

Figure 3:
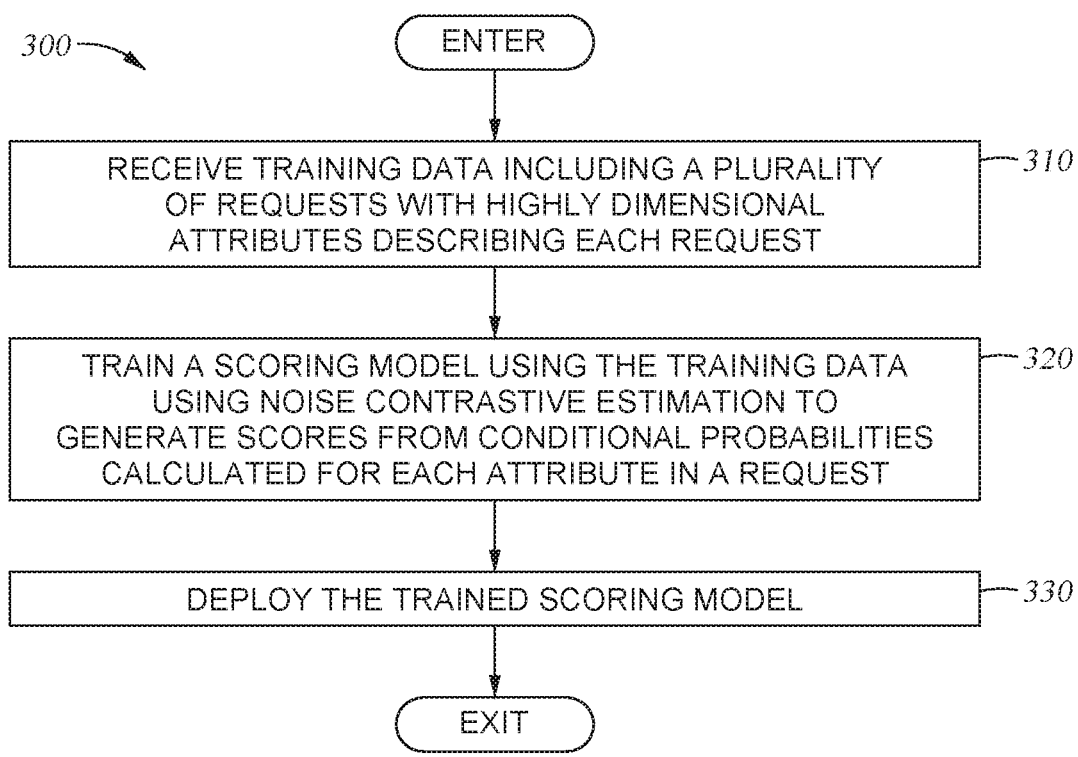
FIG. 3 illustrates example operations for training a scoring model for generating anomaly scores for requests based on estimated conditional probabilities for each attribute in a request, according to one embodiment.

FIG. 3 illustrates example operations 300 that may be performed by a model trainer (e.g., anomaly detection model trainer 120 illustrated in FIG. 1) for training and deploying an anomaly detection model that uses noise contrastive estimation to generates anomaly scores for requests as a combination of estimated conditional probabilities for each attribute in a request, according to an embodiment.

As illustrated, operations 200 begin at block 210, where a system receives training data for a plurality of users of a distributed computing environment. The training data generally includes information about a plurality of requests to invoke various operations within the distributed computing environment. The requests may each include highly-dimensional categorical data that the model trainer can use, individually and in combination, to train a model to estimate conditional probabilities for each attribute of a request. For example, the information may include attributes of each request, such as an API call invoked by a request, a computing resource targeted by the API call, and the like, as well as contextual information about requests received in computing environment 100, such as user identification information (e.g., user name, account identifier, etc.), location information (e.g., geographic location, IP address, etc.), timestamp information, and other information that may provide context about requests generated by users of a computing environment 100.

At block 320, the system trains a scoring model using the training data to generate an anomaly detector for determining whether received requests correspond to probable anomalous activity for a user of the distributed computing system. As discussed, the scoring model may be trained using various unsupervised learning techniques, such as noise contrastive estimation, neural networks, clustering algorithms, or other techniques that can learn probability distributions over a set of user activity data. In some embodiments, to train the scoring model, the training data may be converted into vectors including information about a requested event and the contextual information defining properties of the request. In some embodiments, the vectors may also include explicit indications of whether activity is anomalous or non-anomalous (e.g., for requests stored in activity log data store 130 having probability scores corresponding to a potentially anomalous event and an explicit user indication that the requests were legitimate). The scoring model may be trained to use noise contrastive estimation techniques to calculate conditional probabilities for each dimension of a request. As discussed above, conditional probabilities calculated for each dimension of a request (e.g., each request attribute) may be calculated from embedding functions representing the attribute and contextual information included in the request, and each conditional probability may be combined to generate an anomaly score for a given request.

At block 330, the system deploys the trained scoring model to a request gateway for use in identifying probable anomalous requests received at the request gateway.

Figure 4:
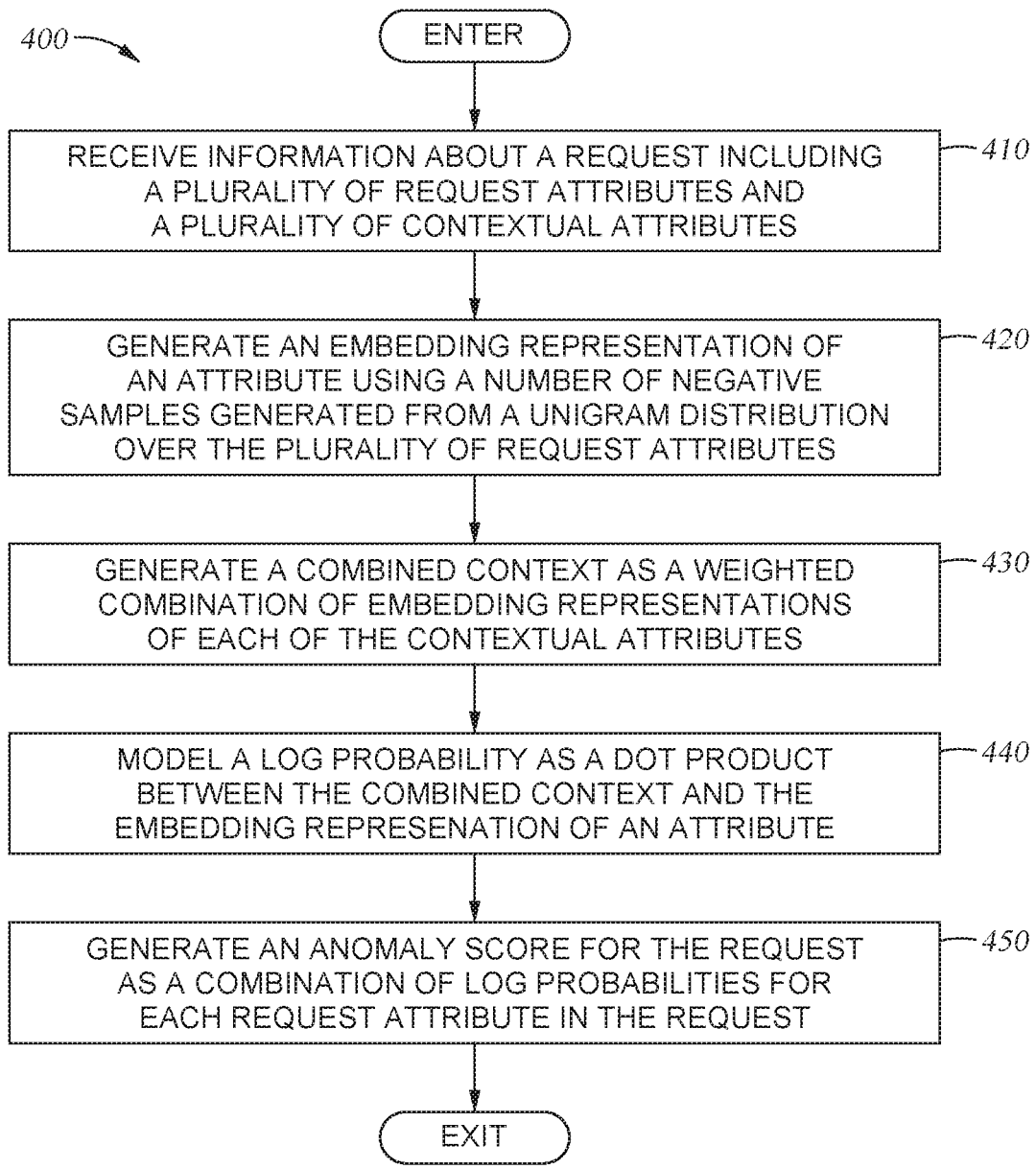
FIG. 4 illustrates example operations for generating an anomaly score for a request as a combination of estimated conditional probabilities for each attribute in the request through a neural architecture, according to one embodiment.

FIG. 4 illustrates example operations 400 that may be performed to calculate anomaly scores for a request indicating a likelihood that a request corresponds to anomalous or non-anomalous activity based on a trained scoring model configured to estimate conditional probabilities for each attribute in a request, according to an embodiment.

As illustrated, operations 400 begin at block 410, where a system receives, from a user of resources in a distributed computing environment, a request to perform an action with respect to one or more identified computing resources in the distributed computing environment. Generally, each request may include a plurality of request attributes and a plurality of contextual attributes. The request attributes may include information identifying the action to be performed, the target computing resources against which the request is to be performed (e.g., a cluster of computing resources located at a particular geographic location), and other information defining an action to be performed against the target computing resources. For example, in a request to spawn a cloud computing instance, the request may include information identifying the cluster in which the cloud computing resources are to be generated, the amount of computing resources to allocate to the cloud computing instance (e.g., a number of processors, amount of memory, network interfaces, virtualizeable I/O devices, etc.), and the like. The request may further include, explicitly or implicitly, contextual information that may be used by a scoring model to determine whether a request corresponds to non-anomalous (legitimate) activity or potentially anomalous activity. This contextual attributes may include, without limitation, information about the user initiating the request, a location from which the request was received, a timestamp indicating when the request was received, and additional contextual information that may be predictive of whether a received request corresponds to anomalous or non-anomalous activity.

At block 420, the system generates an embedding representation of an attribute using a number of negative samples generated from a unigram distribution over the plurality of request attributes. The embedding representation of the attribute may represent the embedding function that embeds an attribute when its conditional probability density function is estimated.

At block 430, the system generates a combined context as a weighted combination of embedding representations of each of the contextual attributes. The embedding representations of each of the contextual attributes may represent the embedding function that embeds the attribute when the attribute appears as context in the conditional probability density function of another attribute.

At block 440, the system models a log probability as a dot product between the combined context and the embedding representation of the attribute.

At block 450, the system generates an anomaly score for the request as a combination of log probabilities for each request attribute included in the request. As discussed, the combination of log probabilities may include, for example, a summation of log probabilities generated for each attribute in the request. The anomaly score generally represents a likelihood that the request corresponds to authentic, authorized activity by the user. Lower scores may indicate a lower probability of the event corresponding to authorized activity recorded for the user, while higher scores may indicate a higher probability of the event corresponding to authorized activity recorded for the user.

Figure 5:
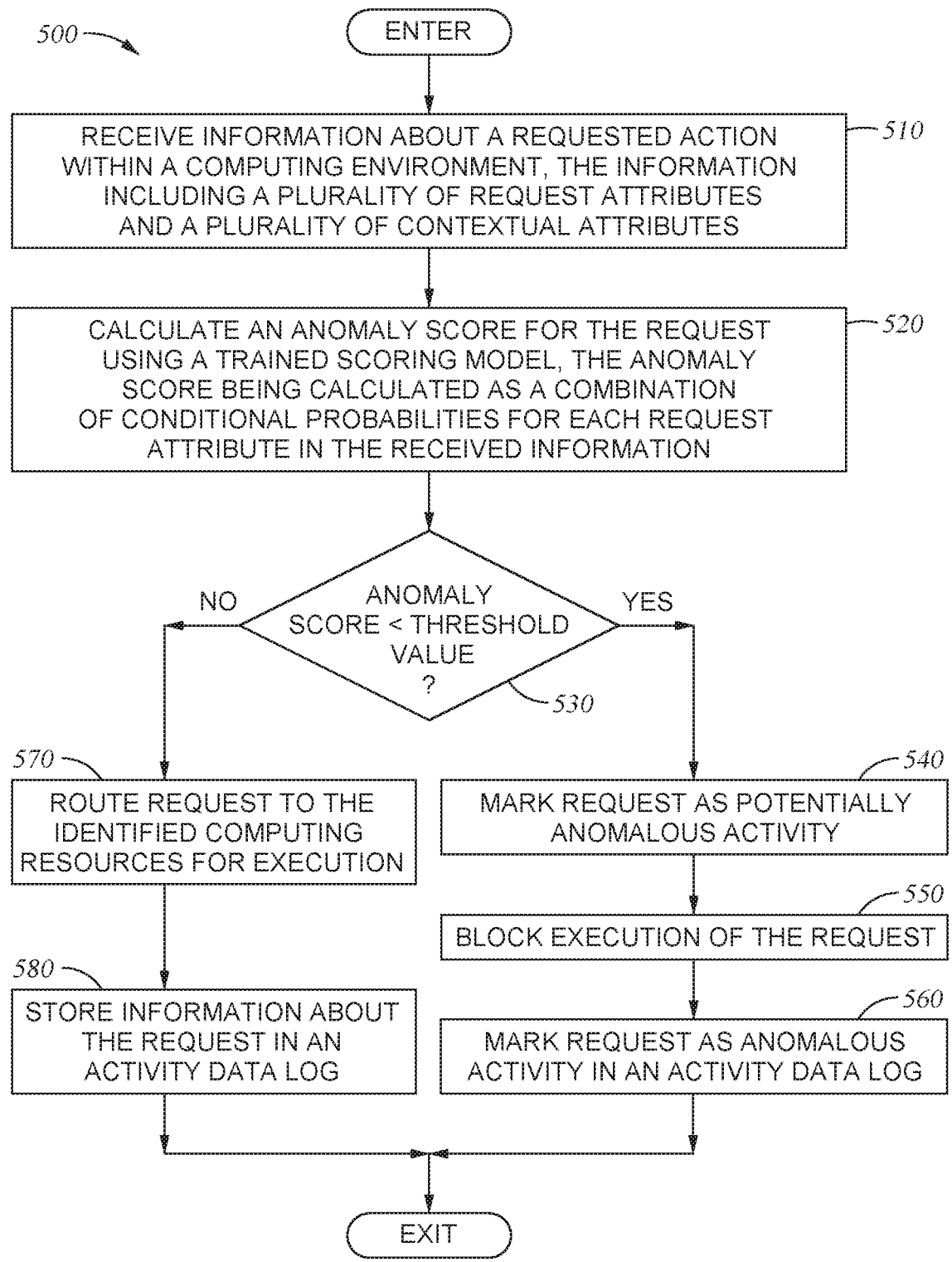
FIG. 5 illustrates example operations for determining whether requests to perform an action within a distributed computing environment is potentially anomalous based on a trained scoring model configured to generate anomaly scores as a combination of conditional probabilities for each attribute in the request and processing the incoming request based on the generated anomaly score, according to one embodiment.

FIG. 5 illustrates example operations that may be performed to determine whether a request to perform an action within a distributed computing environment is potentially anomalous based on a trained scoring model and processing the request based on the generated anomaly score, according to an embodiment. As discussed, the anomaly score may be generated as a combination of conditional probabilities for each attribute in the request.

As illustrated, operations 500 begin at block 510, where a system receives information about a requested action within a computing environment. The information generally includes a plurality of request attributes and a plurality of contextual attributes. As discussed, the request attributes may include information about an API call invoked by the request, the target of the API call, and other request attributes that may be relevant to determining whether the request corresponds to anomalous or non-anomalous activity. The contextual attributes may include, for example, information about the user generating the request, timestamp information associated with the request, originating IP address or geographical location of the request, and other contextual information that may be relevant to determining whether the request corresponds to anomalous or non-anomalous activity. The requests may correspond to various activity within a computing environment, including the activation and termination of cloud computing instances, login/logout or other security-related events in the computing environment, data ingestion or exfiltration, payment activity, and other activity that may be performed within the computing environment.

At block 520, the system calculates an anomaly score for the request using a trained scoring model. The anomaly score may be calculated as a combination of conditional probabilities for each request attribute in the received information. As discussed, to generate the anomaly score, a conditional probability score may be calculated for each request attribute using a first embedding representing the request attribute and a second embedding representing the request attribute when included as context for another attribute. The estimated conditional probability for each request attribute may be combined (e.g., in a summation function) to result in the calculation of the anomaly score.

At block 530, the system determines whether the anomaly score calculated for the request is below a threshold value. As discussed, the threshold value may be defined such that requests having anomaly scores falling below the threshold value are deemed to be potentially anomalous events, while requests having anomaly scores above the threshold value may be deemed to be non-anomalous events.

If, at block 530, the system determines that an anomaly score calculated for the received request is below the threshold value, operations 500 may proceed to block 540, where the system marks the request as potentially anomalous activity. At block 550, the system may block execution of the request, and at block 560, the system may mark the request as anomalous activity in an activity data log.

In some embodiments, the system may request user confirmation of the requested action. To request user confirmation of the requested action, the system can use user information embedded in the request or included in contextual information about the request to query a user database for contact information for the user. The contact information may include, for example, a mobile phone number, a landline phone number, an e-mail address, or other information identifying how a user may be contacted to verify whether activity flagged as potentially anomalous corresponds to legitimate or illegitimate activity for the user. To request confirmation that the user initiated the activity, the system may, for example, send a text message, initiate a telephone call, send an e-mail message, push a notification to a mobile phone or other computing device associated with the user, or take other action based on the contact information provided by a user to the computing environment. If the user confirms that the request corresponds to legitimate activity, the system can re-designate the request as legitimate activity in the activity data log, and the activity data log may be used to re-train the scoring model.

If, at block 530, the system determines that the anomaly score calculated for the received request exceeds a threshold value, the system can determine that the received request corresponds to non-anomalous activity. Based on this determination, operations 500 may proceed to block 560, where the system routes the received request to the identified computing resources for execution, and block 570, where information about the request is stored in an activity data log.

Figure 6:
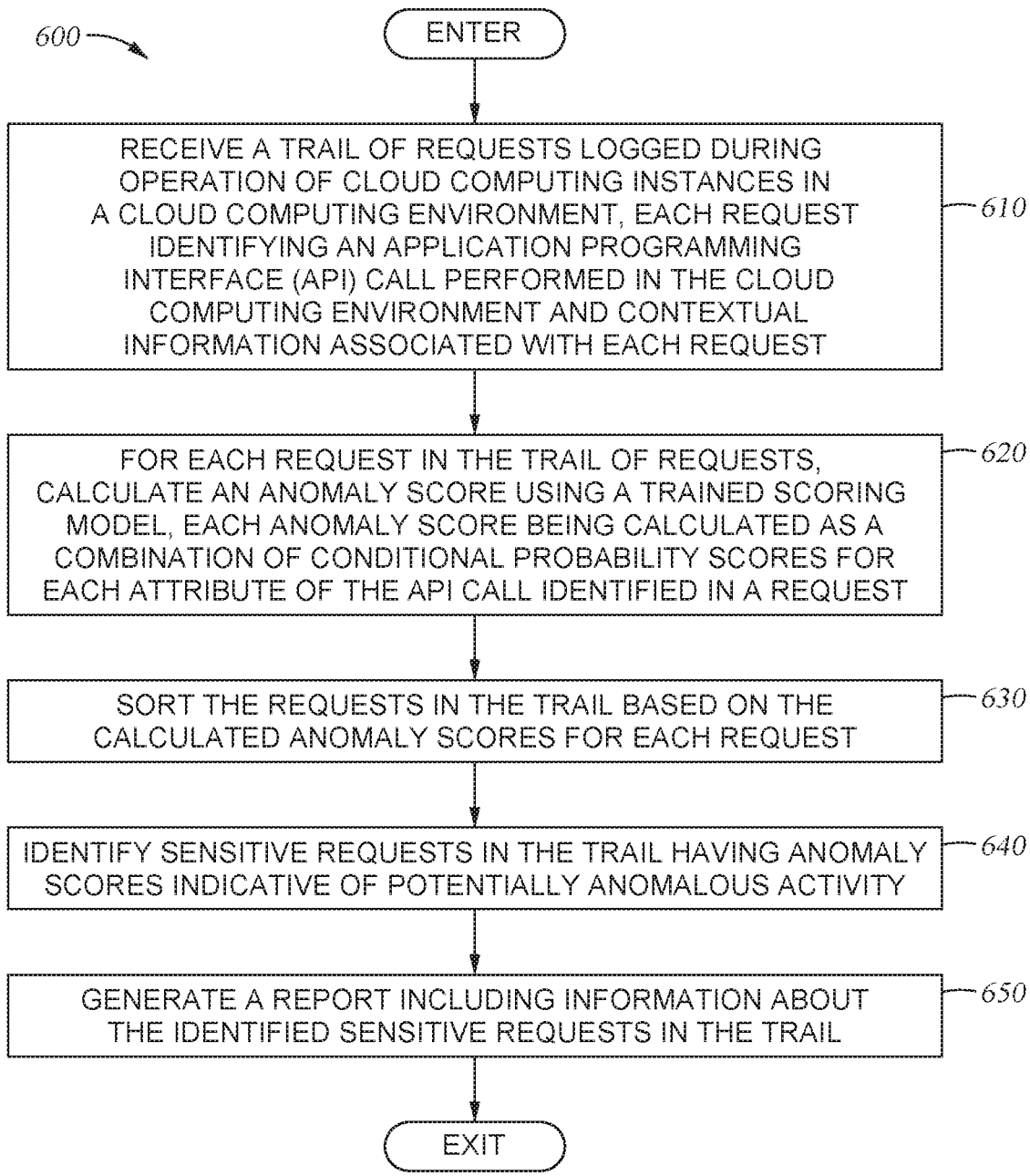
FIG. 6 illustrates example operations for analyzing a trail of requests and detecting anomalous activity within the trail based on anomaly scores generated for each request in the trail, according to one embodiment.

FIG. 6 illustrates example operations 600 for analyzing a trail of requests and detecting anomalous activity within the trail based on anomaly scores generated for each request in the trail, according to one embodiment.

As illustrated, operations 600 begin at block 610, where a system receives a trail of requests logged during operation of cloud computing instances in a cloud computing environment. The trail of requests may include information about various activities within the cloud computing environment, such as the creation or termination of cloud computing instances, thread detection, data logging, invocation of various machine learning services (e.g., to train machine learning models against general data sets, to train machine learning models to identify sensitive data in a data set, etc.), and the like. Some of these services may include GuardDuty, CloudTrail, Macie, and other cloud computing services offered by Amazon Web Services, Inc. of Seattle, Wash. Each request in the trail may identify an application programming interface (API) call performed in the cloud computing environment (including parameters provided as part of the API call) and contextual information associated with each request.

At block 620, the system calculates an anomaly score for each request in the trail of requests. As discussed, the anomaly score may be calculated using a trained scoring model (e.g., a model implementing neural architecture 200 illustrated in FIG. 2). Each anomaly score may be generated as a combination of conditional probability scores for each request attribute included in a request (e.g., each attribute of an API call identified in a request).

At block 630, the system sorts the requests in the trail based on the calculated anomaly scores for each request.

At block 640, the system identifies sensitive requests in the trail having anomaly scores indicative of potentially anomalous activity. Classes or types of sensitive requests may be defined a priori as requests that are to be monitored for potentially anomalous activity. To identify sensitive requests in the trail having anomaly scores indicative of potentially anomalous activity, the system can reduce the sorted set of requests to a set of requests having anomaly scores indicative of potentially anomalous activity (e.g., anomaly scores that do not meet a particular threshold value). The system may then extract requests from the reduced set of requests that correspond to sensitive requests and, at block 650, generate a report including information about the identified sensitive requests in the trail having anomaly scores indicative of potentially anomalous activity.

Figure 7:
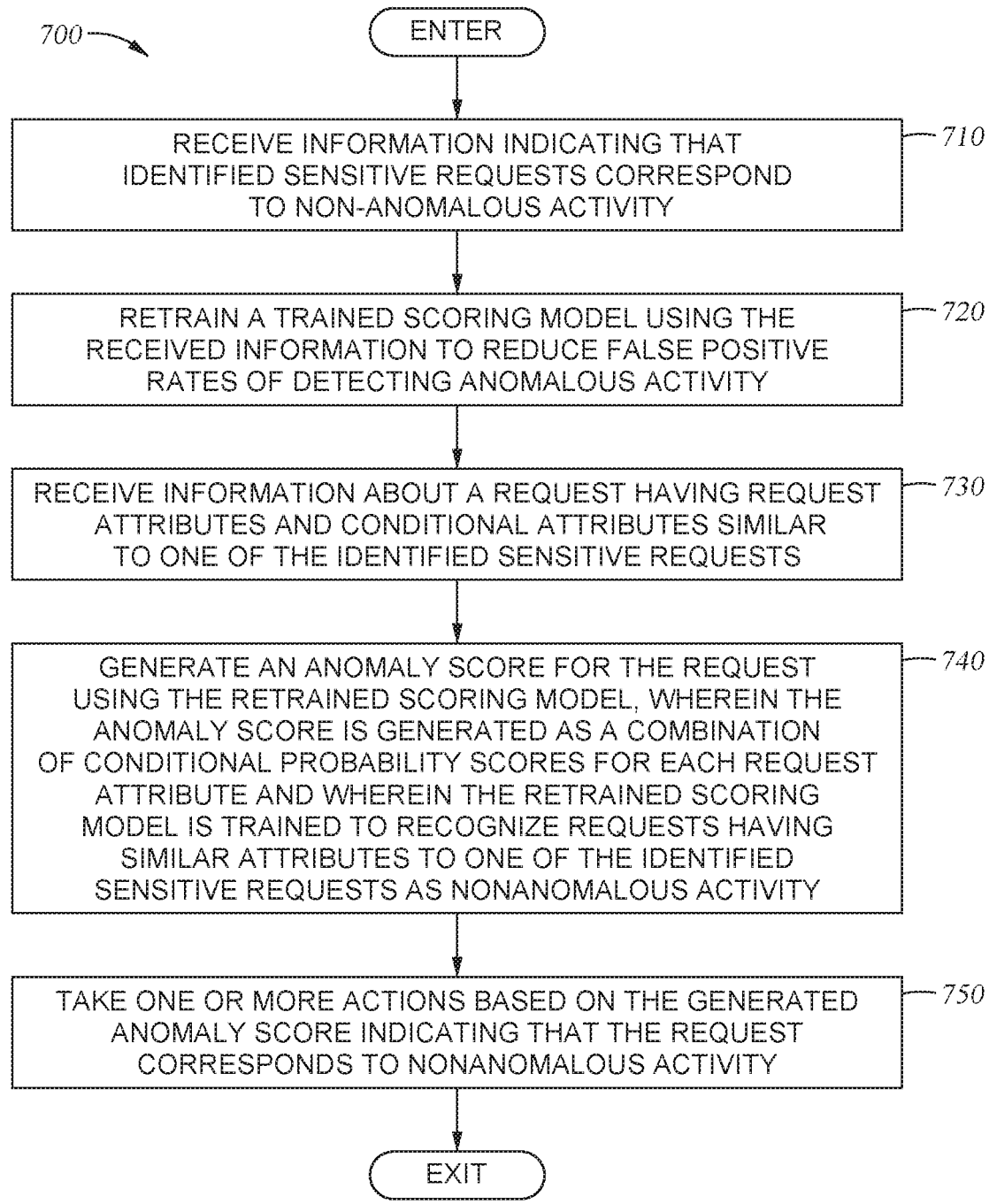
FIG. 7 illustrates example operations for retraining a scoring model based on user identification of potentially anomalous requests as non-anomalous activity and generating anomaly scores for subsequent requests having similar attributes to requests identified as non-anomalous activity, according to one embodiment.

FIG. 7 illustrates example operations 700 for retraining a scoring model based on user identification of potentially anomalous requests as anomalous or non-anomalous activity, according to an embodiment. As illustrated, operations 700 begin at block 710, where the system receives information indicating that identified sensitive requests correspond to non-anomalous activity.

At block 720, the system retrains a scoring model using the received information to reduce false positive rates of detecting anomalous activity. To retrain the scoring model, the system may generate a training data set including labeled data explicitly indicating that requests previously identified as potentially anomalous activity actually correspond to non-anomalous activity. The label information may be used by a model trainer to train a scoring model, as discussed above, to generate embeddings for each attribute and use the generated embeddings calculate conditional probabilities for each attribute. The label information may be used, for example, to modify the calculated conditional probability for each attribute to generate an anomaly score that exceeds a threshold value for activity deemed to correspond to non-anomalous activity.

At block 730, the system receives information about a request having request attributes and conditional attributes similar to one of the identified sensitive requests corresponding to non-anomalous activity. The information about the request may be received in real-time or from a log of historical data.

At block 740, the system generates an anomaly score for the request using the retrained scoring model. The anomaly score, as discussed, may be generated as a combination of conditional probability scores for each request attribute. The retrained scoring model may be trained to recognize requests having similar attributes to one of the identified sensitive requests as non-anomalous activity.

At block 750, the system takes one or more actions based on the generated anomaly score indicating that the request corresponds to non-anomalous activity. For example, where an anomaly score for a request is generated in real-time, the system may allow execution of the request against the computing resources identified in the request. In another example, where an anomaly score is generated for a request that has previously been executed in the computing environment 100, the system may omit the request from a report identifying potentially anomalous activity within computing environment 100.

Figure 8:
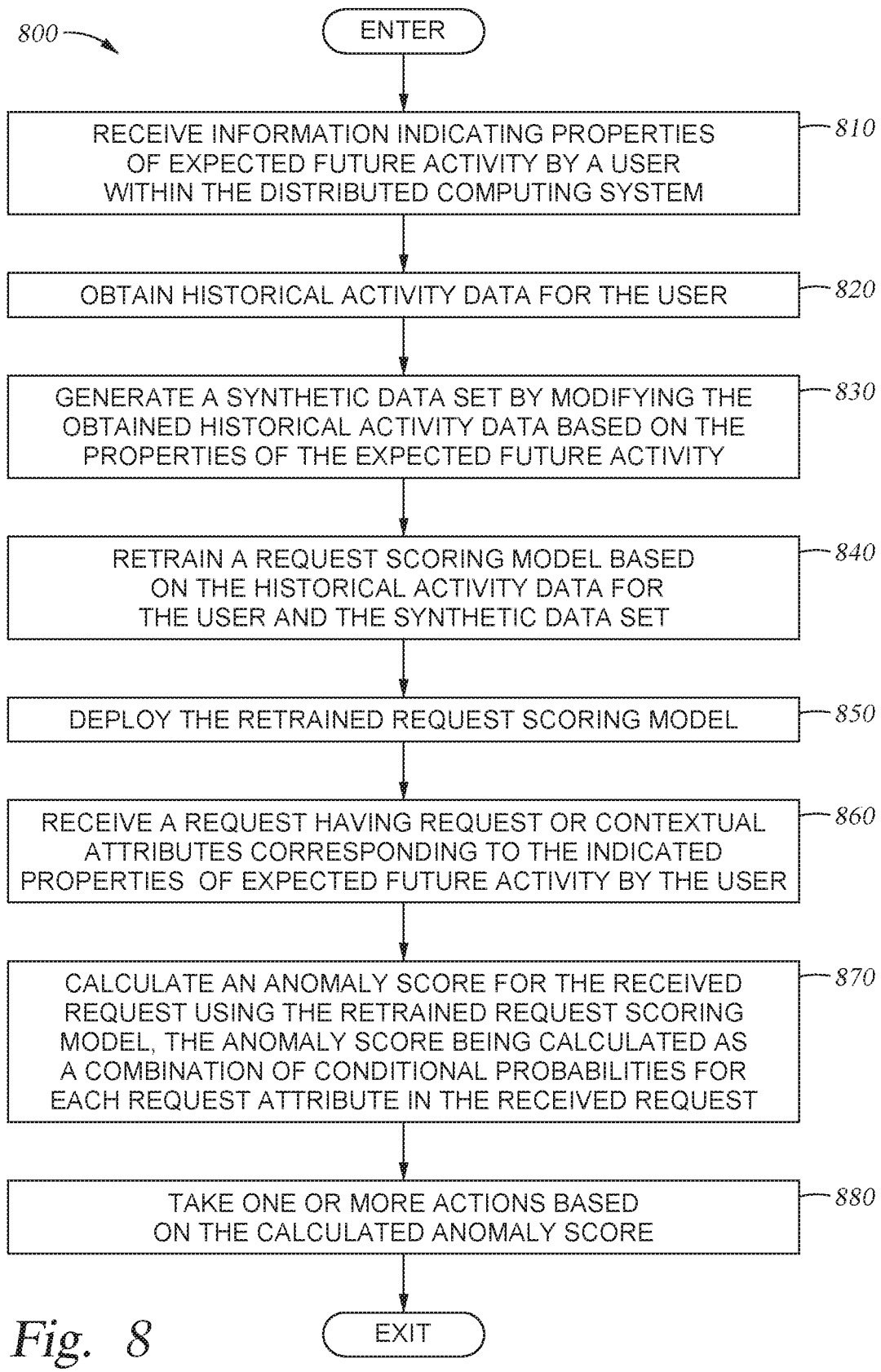
FIG. 8 illustrates example operations for training a scoring model using historical user activity and a synthetic data set corresponding to expected future activity to identify the expected future activity as non-anomalous activity, according to one embodiment.

FIG. 8 illustrates example operations 800 for training a scoring model using historical user activity and a synthetic data set generating based on existing historical log data and information about expected future user activity within a distributed computing system, according to an embodiment. As discussed, the generation of training data based on information about expected future user activity may be used to train a scoring model to recognize expected activity as non-anomalous activity even though such activity may not have been encountered previously within the distributed computing environment (and thus would likely have been marked as potentially anomalous activity within the distributed computing environment).

As illustrated, operations 800 begin at block 810, where a system receives information indicating properties of expected future activity by a user within the distributed computing system. The properties of expected future activity may include, for example, expected times at which the user plans to initiate activity within the distributed computing system, expected locations from which the user plans to generate requests to perform activity within the distributed computing system, and other contextual information that may be used in a scoring model to determine a probability score indicating a likelihood that activity corresponds to anomalous or non-anomalous activity.

At block 820, the system obtains, from an activity log, historical activity data for the user.

At block 830, the system generates a synthetic data set by modifying the obtained historical activity data based on the properties of the expected future activity. For example, if a user indicates that future activity may be generated from London, the system can modify the obtained historical activity data to replace IP addresses included in the historical activity data with IP addresses known to be located in or around London. In another example, a user indication of a location from which future requests are to be received may also be used to modify timestamp information in the obtained historical data. For example, if the user is presently located in California but expects to generate activity from New York in the future, the timestamps included in the obtained historical data may be modified to reflect the three-hour time zone difference between the user's current and expected future location.

At block 840, the system retrains a request scoring model based on the modified historical activity data. In some embodiments, the modified historical activity data may be combined with other training data from activity log data store 130 prior to providing a training data set to a model trainer for use in training the scoring model. As discussed above, the scoring model may be trained using various unsupervised learning techniques, such as noise contrastive estimation, to generate probability scores for a request based on the requested activity and contextual information associated with the request.

At block 850, the system deploys the retrained request scoring model to a request gateway for identifying probable anomalous requests received at the request gateway. As discussed, future activity by a user having the indicated properties may not be flagged as potentially anomalous, as similar activity may be included in a training data set used to generate the request scoring model (despite such activity not actually having occurred in the past).

At block 860, the system receives a request having request attributes or contextual attributes corresponding to the indicated properties of expected future activity by the user.

At block 870, the system calculates an anomaly score for the received request using the retrained request scoring model. The anomaly score may be calculated as a combination of conditional probabilities for each request attribute in the received request. Because the retrained scoring model may be retrained based on a synthetic data set including attributes corresponding to the expected future activity, the calculated anomaly score for the request may be calculated such that the request is indicated to correspond to non-anomalous activity within the computing environment.

At block 880, the system takes one or more actions based on the calculated anomaly score. As discussed, where an anomaly score for a request is generated in real-time, the system may allow execution of the request against the computing resources identified in the request. In another example, where an anomaly score is generated for a request that has previously been executed in the computing environment 100, the system may omit the request from a report identifying potentially anomalous activity within computing environment 100.

FIG. 9 illustrates an example user activity history for training a scoring model and determination of whether a received request to perform an action corresponds to potentially anomalous activity, according to an embodiment.

As illustrated, user activity history 910 includes a plurality of log entries identifying an account and a username associated with the user generating the requests illustrated in user activity history 910. The log entries further include a timestamp at which a request was generated, the IP address from which the request was generated, and the requested activity. It should be recognized that the information illustrated in user activity history 510 is non-limiting, and the log data may include further information that may be probative of whether a received request is non-anomalous activity initiated by the user or potentially anomalous activity initiated by someone impersonating the user.

In this example, a user associated with the account ID of "b6f0df04" and username "jsmith" has generated activity corresponding to a consistent pattern. Specifically, as illustrated, the user requests the creation of four cloud computing instances in the US West region around 10:30 am and requests the termination of four cloud computing instances in the US West region around 6:30 pm. Because the user has displayed a consistent pattern of requesting the creation and termination of cloud computing instances at the specified times, future activity in line with the activity illustrated in user activity history 910 may be determined to be non-anomalous activity and may be executed within the distributed computing environment without user confirmation.

User activity history 910 may be input as training data into a model training system to generate anomaly detection model 920, which, as discussed above, uses historical activity to determine probability scores corresponding to a likelihood that a received request to perform an action within a distributed computing environment is anomalous or non-anomalous activity. Generally, higher probability scores indicate that a received request corresponds to non-anomalous (e.g., expected) activity. Meanwhile, lower probability scores indicate that a received request corresponds to potentially anomalous activity.

As illustrated, a system receives incoming request 930 and processes the incoming request 530 through anomaly detection model 920 to generate a request score 940 indicating the probability that the incoming request 930 corresponds to anomalous activity. In this example, incoming request 930 is associated with the account ID of "b6f0df04" and username "jsmith". However, the incoming request 930 includes contextual information that is different from the previously recorded contextual information. Specifically, the termination event requested in incoming request 930 has a timestamp that is some 7 hours earlier than termination requests recorded in user activity history 910. Additionally, the IP address included in incoming request 930 does not match the IP address included in the log entries in user activity history 910. Specifically, while the IP addresses included in the log entries in user activity history 910 may be traced to an IP address block allocated for devices in California, the IP address included in the incoming request 930 may be traced to an IP address block allocated for devices in Russia.

Based on the differences between the log data in user activity history 910 and the information included in incoming request 930, anomaly detection model 920 may calculate a probability score indicating that the incoming request 930 likely represents anomalous activity. As illustrated, anomaly detection model 920 generates a request score 540 of 0.0010359, which may indicate that the activity corresponds to a low-probability event. Request score 940 may be output to a request processor for use in determining whether to allow or block execution of the incoming request. In this case, because the request score 940 indicates a very low probability that the incoming request 930 corresponds to non-anomalous activity, a request processor can block execution of the incoming request pending user confirmation of whether the request was actually initiated by the user (as opposed to being initiated by someone impersonating the user).

Figure 10:
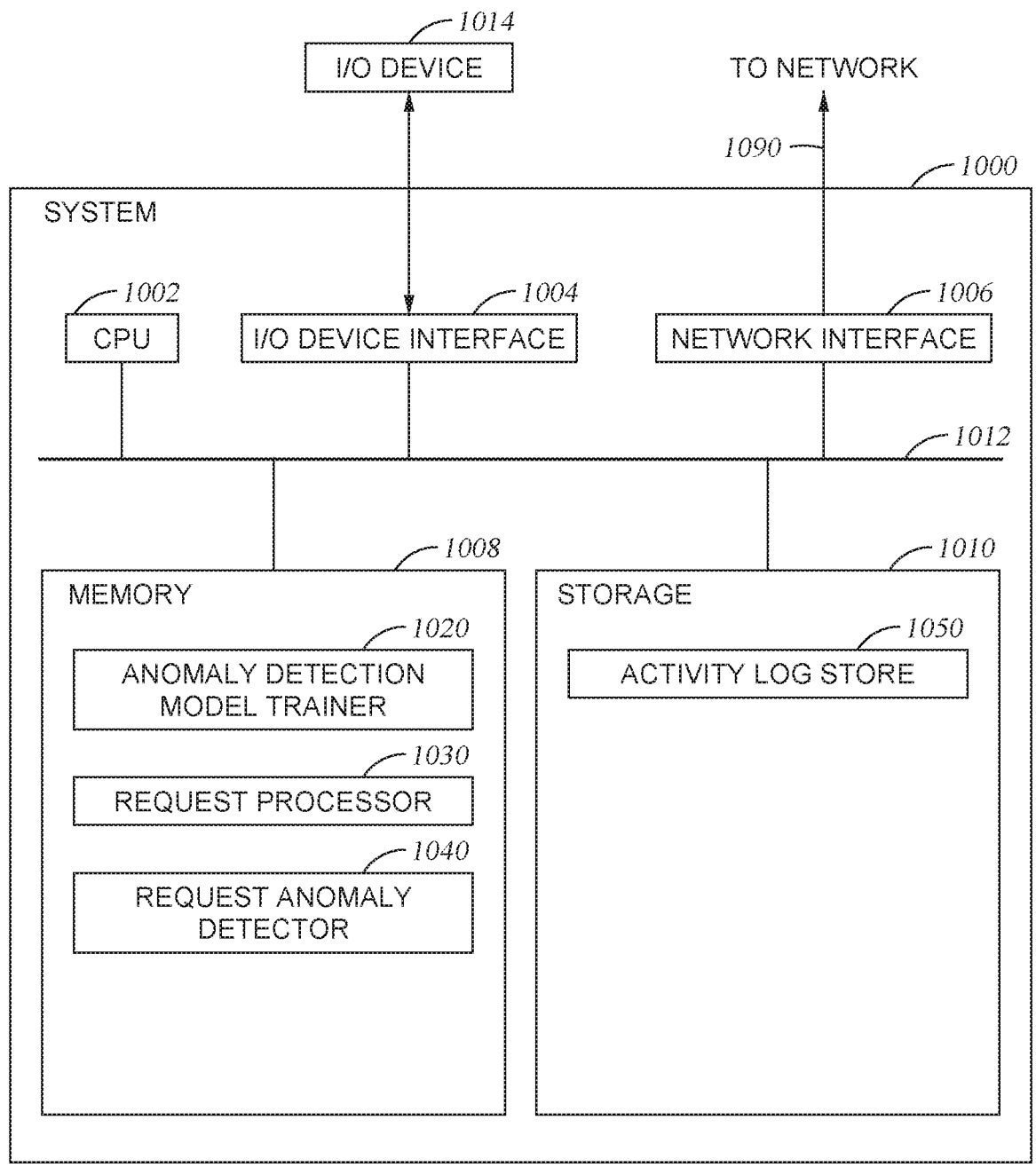
FIG. 10 illustrates an example computing system in which aspects of the present disclosure may be performed.

FIG. 10 illustrates an example system 1000 for generating a scoring model based on noise contrastive estimation techniques for identifying whether received requests correspond to non-anomalous or potentially anomalous activity, according to embodiments of the present disclosure.

As shown, system 1000 includes a central processing unit (CPU) 1002, one or more I/O device interfaces 1004 that may allow for the connection of various I/O devices 1014 (e.g., keyboards, displays, mouse devices, pen input, etc.) to the system 1000, network interface 1006, a memory 1008, storage 1010, and an interconnect 1012.

CPU 1002 may retrieve and execute programming instructions stored in the memory 1008. Similarly, the CPU 1002 may retrieve and store application data residing in the memory 1008. The interconnect 1012 transmits programming instructions and application data, among the CPU 1002, I/O device interface 1004, network interface 1006, memory 1008, and storage 1010. CPU 1002 is included to be representative of a single CPU, multiple CPUs, a single CPU having multiple processing cores, and the like. Additionally, the memory 1008 is included to be representative of a random access memory. Furthermore, the storage 1010 may be a disk drive, solid state drive, or a collection of storage devices distributed across multiple storage systems. Although shown as a single unit, the storage 1010 may be a combination of fixed and/or removable storage devices, such as fixed disc drives, removable memory cards or optical storage, network attached storage (NAS), or a storage area-network (SAN).

As shown, memory 1008 generally includes an anomaly detection model trainer 1020, a request processor 1030, and a request anomaly detector 1040. Anomaly detection model trainer 1020 generally is configured to receive, as input, historical activity data (e.g., from activity log store 1050 or a remote activity log data store 130), train a scoring model to calculate conditional probabilities of whether an incoming request corresponds to non-anomalous or potentially anomalous activity, and deploy the trained model to request anomaly detector 1040. Anomaly detection model trainer 1020 may use various unsupervised learning techniques to train the scoring model. For example, the scoring model may be trained to use noise contrastive estimation techniques to generate conditional probabilities for any given input representing an incoming request to be processed against computing resources in a distributed computing system. Request processor 1030 generally receives incoming requests, obtains a probability score from a request anomaly detector 1040, and uses the obtained probability score to determine how to process a received request. Request anomaly detector 1040 generally is configured to apply a scoring model trained by anomaly detection model to information about an incoming request to generate a probability score indicative of whether the incoming request corresponds to non-anomalous or potentially anomalous activity.

Storage 1010 generally comprises an activity log store 1050. As discussed, activity log store 1050 generally includes historical log data about requests received and processed within a distributed computing environment. The historical log data may include information about a requested event and contextual information about the request, such as a timestamp associated with the request, information about the location from which the request was received, user information corresponding to the request, and other information that may be used to train a scoring model to determine whether an incoming request corresponds to non-anomalous or potentially anomalous activity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure.

However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the anomaly detection system could execute on a computing system in the cloud and manage the execution of incoming requests on computing resources in the cloud based on whether the incoming requests correspond to anomalous or non-anomalous activity. In such a case, the anomaly detection system could train an anomaly detection model and use the anomaly detection model to determine whether incoming requests are anomalous or non-anomalous activity and store the trained anomaly detection model and training data used to generate the anomaly detection model at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for detecting potentially anomalous activity in a computing environment, comprising:
    receiving, by a computing system, a training data set of requests executed within the computing environment, wherein each request in the training data set comprises a plurality of request attributes and a plurality of contextual attributes;
    training, by the computing system, a scoring model to generate anomaly scores for a request based on the received training data set, wherein training the scoring model comprises:
        learning a first embedding corresponding to an attribute of the request attributes,
        learning a second embedding corresponding to instances in which the attribute is included as context to a different attribute,
        learning a conditional probability distribution based on the first and second embeddings, and
        generating the conditional probability distribution using noise contrastive estimation over vectors including the attribute and the plurality of contextual attributes;
    receiving, by the computing system, a request to invoke an action within the computing environment;
    generating, by the computing system, an anomaly score for the request by applying the trained scoring model to attributes of the request, wherein:
        the anomaly score indicates a likelihood that the properties of the request correspond to historical activity within the computing environment for a user associated with the request, and
        generating the anomaly score by combining conditional probability values calculated for the attributes in the request; and
    based on the generated anomaly score, taking, by the computing system, an action to process the request.

2. The method of claim 1, wherein the action comprises including the request in a set of potentially anomalous requests, and wherein the method further comprises:
    receiving, by the computing system, information indicating that the request corresponds to non-anomalous activity; and
    retraining, by the computing system, the scoring model based on the received information so as to identify future requests having attributes similar to the request as non-anomalous activity.

3. The method of claim 1, wherein the taking the action to process the request comprises:
    flagging the request as a potentially anomalous request based on the comparison of the generated anomaly score to the threshold value;
    upon receiving confirmation that the user initiated the request to invoke the action within the computing environment:
        labeling the request as non-anomalous activity, and
        retraining the scoring model based on the received confirmation so as to identify future requests having attributes similar to the request as non-anomalous activity.

4. The method of claim 1, wherein the conditional probability value calculated for an attribute in the request comprises a dot product between an embedding representation of the attribute in the request and a combined context of the request, the combined context being a weighted combination of embedding representations of contextual attributes of the request.

5. The method of claim 1, further comprising:
    receiving, by the computing system, information about properties of expected future requests within the computing environment that is expected to be flagged as potentially anomalous activity;
    generating, by the computing system, a synthetic training data set by modifying historical activity within the computing environment based on the properties of expected future requests within the computing environment; and
    retraining, by the computing system, the scoring model based on the synthetic training data set.

6. The method of claim 5, further comprising:
    receiving, by the computing system, a second request to invoke an action in the computing environment, the second request having attributes corresponding to the properties of the expected future requests;
    calculating, by the computing system, an anomaly score for the second request using the retrained scoring model, wherein the anomaly score for the second request is generated by combining conditional probability values calculated for the attributes in the second request, the conditional probability values calculated for the attributes in the second request indicating that the second request corresponds to non-anomalous activity; and
    determining, by the computing system, based on the calculated anomaly score for the second request, that the second request corresponds to non-anomalous activity.

7. The method of claim 1, further comprising:
    maintaining, by the computing system, a counter of requests determined to be potentially anomalous for the user associated with the received request based on the generated anomaly scores over a sliding time window;
    determining, by the computing system, the user is generating anomalous requests at a rate exceeding an expected rate of anomalous requests based on a comparison of the counter and a historical rate at which anomalous requests are generated; and determining, by the computing system, that the user is generating anomalous requests at a rate exceeding the expected rate of anomalous requests; and blocking, by the computing system, execution of requests generated by the user.

8. A method for training a predictive model for identifying potentially anomalous activity within a computing environment, comprising:

receiving, by a computing system, a data set comprising historical request data for a plurality of users in the computing environment, each entry in the data set corresponding to a specific request to invoke an action in the computing environment and including a plurality of attributes describing the specific request;

learning, by the computing system, a plurality of embeddings in a neural network, each of the plurality of embeddings being configured to estimate a conditional probability associated with an attribute describing a request, wherein the plurality of embeddings in the neural network comprises a first embedding for estimating a conditional probability distribution of the attribute describing a request and second embeddings for estimating a conditional probability when the attribute is included as context while estimating a conditional probability for a second attribute;

learning, by the computing system, a conditional probability distribution function over the plurality of embeddings; and deploying, by the computing system, a model generated from the learned conditional probability distribution function and the learned plurality of embeddings to a request gateway for identifying potentially anomalous requests received at the request gateway.

9. The method of claim 8, wherein the one or more second embeddings are combined in a fully connected layer of a neural network to generate a combined context for an attribute of a request.

10. The method of claim 8, wherein the learned conditional probability function comprises a product of a plurality of conditional probabilities calculated for the plurality of attributes.

11. The method of claim 10, wherein each respective conditional probability of the plurality of conditional probabilities calculated for the plurality of attributes comprises a dot product of a weighted combination of embedding representations of context attributes for a respective attribute and an embedding representation of the respective attribute.

12. The method of claim 8, further comprising:

learning, by the computing system, a normalization constant for the conditional probability distribution function as part of the neural network.

13. The method of claim 8, wherein the conditional probability function is learned using noise contrastive estimation over a plurality of vectors correlating a request attribute included in a request with contextual attributes of the request.

14. A method for monitoring for potentially fraudulent activity within a computing environment, comprising:

receiving, by a computing system, a data set of requests to perform actions within a computing environment associated with a user, generating, by the computing system, an anomaly score for the requests in the data set by applying a trained scoring model to attributes of a respective request, wherein:

the anomaly score indicates a likelihood that the attributes of the respective request correspond to historical activity within the computing environment for the user, the trained scoring model comprises a model trained using historical activity within the computing environment for a plurality of users, the historical activity within the computing environment for the plurality of users including information identifying an operation performed in the computing environment and contextual information about a historical request, and generating the anomaly score as a combination of conditional probability scores for the attributes included in the respective request based on a conditional probability distribution function trained using noise contrastive estimation over vectors representing an attribute of a request and contextual attributes associated with the request;

generating, by the computing system, from the anomaly scores generated for the requests in the data set, a distribution of the anomaly scores;

generating, by the computing system, a report including requests in the data set having anomaly scores indicative of anomalous activity within the computing environment; and managing, by the computing system, user access to resources within the computing environment based, at least in part, on the generated report.

15. The method of claim 14, wherein managing user access to resources within the computing environment comprises:

determining whether the user is associated with fraudulent activity within the computing environment based on the distribution of the probability scores;

determining that the user is associated with fraudulent activity within the computing environment; and taking an action to block the user from accessing the computing environment.

16. The method of claim 15, wherein determining whether the user is associated with fraudulent activity comprises:

determining whether the requests in the data set correspond to anomalous activity;

calculating a rate at which anomalous activity is detected within the data set of requests associated with the user;

determining that the rate at which anomalous activity is detected within the data set of requests associated with the user exceeds a threshold rate; and determining that the user is associated with fraudulent activity within the computing environment.

17. The method of claim 15, wherein the requests included in the generated report comprise requests corresponding to classes of sensitive activity within the computing environment.

18. The method of claim 14, further comprising:

receiving, by the computing system, information indicating that the requests included in the report correspond to non-anomalous activity;

updating, by the computing system, the data set to indicate that the requests included in the report correspond to non-anomalous activity; and retraining, by the computing system, the scoring model based on the updated data set.

19. The method of claim 18, further comprising:
receiving, by the computing system, a second request having request attributes or contextual attributes similar to a request included in the report;
generating, by the computing system, a second anomaly score for the second request based on a combination of conditional probability scores generated by the retrained scoring model for the attributes in the second request; and
determining, by the computing system, that the second request corresponds to non-anomalous activity.

* * * * *